United States Patent [19]

Biolley et al.

[11] Patent Number: 4,568,931
[45] Date of Patent: Feb. 4, 1986

[54] DIGITAL INFORMATION TRANSMITTING SYSTEM THROUGH AN OPTICAL TRANSMISSION MEDIUM

[76] Inventors: Alain P. M. Biolley, 46 Avenue Mozart, 75016 Paris; Jean M. Boulaye, Rue De La Paix, 91360 Villemoisson-sur-Orge; Bernars F. Maurel, 163 Rue De Charonne, 75011 Paris, all of France

[21] Appl. No.: 443,686

[22] Filed: Nov. 22, 1982

[30] Foreign Application Priority Data

Nov. 25, 1981 [FR] France .................. 81 22070

[51] Int. Cl.⁴ .................. H04Q 9/00; H04J 3/02; H04B 9/00
[52] U.S. Cl. .................. 340/825.57; 370/4; 455/607
[58] Field of Search .............. 340/825.57, 870.28; 350/96.16; 370/1–4, 16, 56, 91; 455/603, 606, 612, 613

[56] References Cited

U.S. PATENT DOCUMENTS

| | | | |
|---|---|---|---|
| 4,288,869 | 9/1981 | Kolodzey et al. | 370/4 |
| 4,313,192 | 1/1982 | Nelson et al. | 370/4 |
| 4,326,298 | 4/1982 | Fromm et al. | 455/607 |
| 4,399,563 | 8/1983 | Greenberg | 455/612 |
| 4,408,307 | 10/1983 | Harris | 340/870.28 |
| 4,417,334 | 11/1983 | Gunderson et al. | 370/16 |
| 4,441,180 | 4/1984 | Schussler | 370/3 |

FOREIGN PATENT DOCUMENTS

2473823  7/1981  France .

Primary Examiner—Donald J. Yusko
Attorney, Agent, or Firm—Lowe, King, Price & Becker

[57] ABSTRACT

The digital information transmitting system comprises several subscriber stations and a processor for managing the exchange of information between said stations. The processor includes several optical circuits for receiving information emitted from the optical emitters in the stations respectively, and a single optical circuit for emitting grouped informations to all the optical receivers of the stations. An optical transmission pluribus is interconnected between the stations and the processor. The optical pluribus comprises several optical unidirectional forward lines for each linking the respective station emitter to a respective receiving circuit of the processor, and a single optical unidirectional distributed backward line for linking the single emitting circuit of the processor to all the station receivers.

13 Claims, 14 Drawing Figures

DIGITAL INFORMATION TRANSMITTING SYSTEM THROUGH AN OPTICAL TRANSMISSION MEDIUM

BACKGROUND OF THE INVENTION

1. Field of the Invention

This invention relates to digital information or data transmission along an optical bidirectional transmission medium.

More particularly, the invention concerns a digital information transmitting system that essentially comprises several stations, each including an emitter and a receiver, and information processing means for managing the information emissions and receptions between the stations. The processing means and the stations are interconnected to the optical transmission medium such that an emitter of a given station may communicate with the receivers of one or more given stations. The optical transmission medium usually, called an optical bus includes one or more optical fibers in a garland or star array connecting the emitters and receivers via the processing means. The information transmitted in-line usually takes the form of a series of luminous pulses or bits resulting from a known coding operation, e.g. pulse code modulation (PCM).

A message is formed of a series of bits directed from an emitter of a given station toward one or more receivers of other stations. Besides useful data, this message can comprise service, synchronization and address information along with any other information required for the message transmission.

2. Description of the Prior Art

Optical bus transmission systems are already known. French patent application 2,473,823 describes an optical bus transmission system in which each emitter communicates with the other emitters through an optical transmission medium called a bus. In response to each data transmission, a processing means authorizes a station to emit and authorizes at least one other station to receive; to this end the processing means sends orders along the bus, in accordance with a given exchange procedure. The optical fiber garland-arrayed systems cannot, as a result of the optical link analysis, accept a high number of shunt and insertion branches on a single optical line. Those lines that carry repeater-regenerators introduce phase shifts and additional noise, giving rise to a reduction in the useful pass band of the line and a limit on the maximum distance between remote subscriber stations.

The systems making use of star-array passive couplers introduce considerable attenuation in the optical signal. Such systems on special components that are difficult to double up and which determine the optical transmission characteristics.

Furthermore, should a subscriber station become defective, the optical bus can be disturbed and adversely affect the transmission of other messages. Seeking out the failure or checking the circuits induces disturbance of the same nature. Such systems provide periodic processing of the bus lines in order to attribute an emission time to each station. Lastly, more recent systems include a programming mode covering message transfer along the bus in order to provide bus access possibilities at times chosen by the subscriber. However, the precise moment when the bus becomes available depends on the traffic at the particular instant along the multiple subscriber lines connected to the bus and on the system configuration.

OBJECTS OF THE INVENTION

The main object of this invention is to provide a digital information transmitting system wherein time-division multiple access on a forward line, from the stations to the processing means, as in the prior art, is not provided. Instead, multiple access in a processor referred to as a concentrating and switching central processor (CSCP) is generally performed on a backward line. A system of this nature is termed a optical pluribus.

SUMMARY OF THE INVENTION

The optical transmitting system embodying the invention is such that an emitter in each station is connected to one receiver of the a processing means via one individual optical line called an optical forward line. A receiver in each station is connected to an emitter of said processing means that is common to the stations via a distributed line between said stations, called an optical backward line.

The emitter of said processing means transmits all information signals along said backward line at a bit rate higher than that of the forward lines. The processing means comprises means for receiving the information signals emitted from the stations in an asynchronous or synchronous fashion.

In accordance with an aspect of this invention, the information processing means comprises means connected to the receiving means of the processing means for recovering a clock signal derived from each of said stations. Means connected to said clock signal recovering means recognizes and detects headings of the messages emitted by the station emitters. Means connected to said heading recognizing and detecting means stores the useful information emitted by said station emitters. Means connected to said storing means and controlled by said heading recognizing and detecting means groups the stored useful information with a predetermined heading. The grouped information signals are encoded and coupled to said emitting means of said processing means.

In accordance with another aspect of this invention, the optical transmitting system may comprise one or several processing means and other optical forward lines and other optical backward lines, either for relieving a group of stations or for processing several groups of stations that may communicate with each other.

The optical transmitting systems embodying the invention allows practically permanent self-control of each transmitting line without the messages emitted from a station being disturbed by the messages emitted by the other stations. The optical transmission system as per the invention makes it possible to overcome the vulnerability of traditional transmitting systems to radioelectric or electromagnetic interference.

The optical transmitting system embodying the invention makes it possible to side step the digital bit-rate limitation drawbacks associated with traditional optical buses. Moreover, when any number of stations is introduced or dropped from the system within the maximum limits envisioned, there need not be any adjustment of the optical transmission or any modification in the operational software.

The optical pluribus embodying the invention does not call for an active repeater at each subscriber station and affords a substantial transmission margin allowing the use of high attenuation optical lines.

BRIEF DESCRIPTION OF THE DRAWING

Other objects, features and advantages of the invention will be apparent from the following more particular description of the preferred embodiments of the invention as illustrated in the accompanying drawings, in which.

DESCRIPTION OF THE PREFERRED EMBODIMENTS

Figure 1:
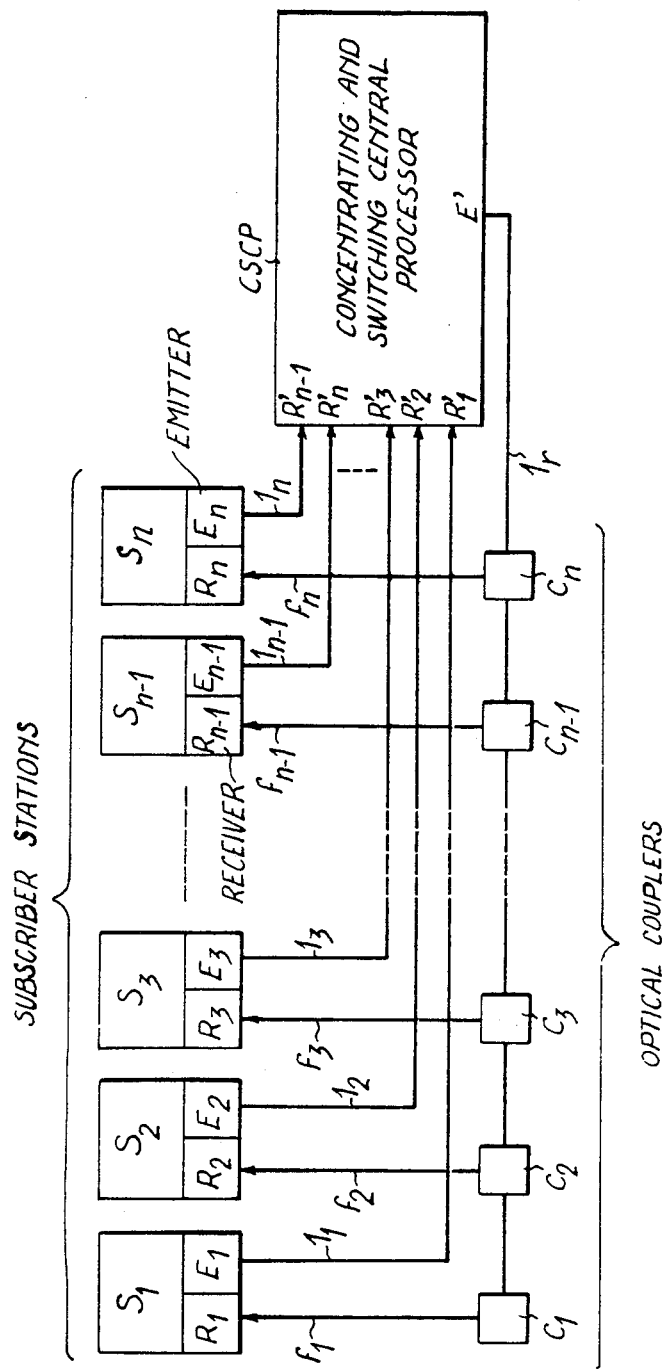
FIG. 1 is a schematic block diagram of a system comprising a central processor and a optical backward line.

With reference to FIG. 1, n subscriber stations $S_1, S_2, S_3, \ldots S_{n-1}, S_n$ are each connected, according to the invention, to a concentration and switching central processor (CSCP) through an individual optical unidirectional forward line $l_1, l_2, l_3, \ldots l_{n-1}, l_n$ which consists of an optical waveguide such as a single optical fiber. Each station $S_i$ with $1 \leq i \leq n$, essentially comprises an optical information emitter $E_i$ and an optical information receiver $R_i$. The n forward lines $l_1$ to $l_n$, referred to as optical subscriber lines, are respectively connected to n individual optical information receivers $R'_1$ to $R'_n$ included in the central processor CSCP. The n receivers $R_1$ to $R_n$ in the subscriber stations $S_1$ to $S_n$ are also connected, in accordance with the invention, to a single common optical unidirectional backward line $l_r$ via connection fibres $f_1$ to $f_n$ which are coupled up to the backward line $l_r$ by means of optical couplers $C_1$ to $C_n$. The central processor CSCP transmits the messages along the backward line $l_r$ by means of a single information emitter $E'$.

The messages are transmitted in the lines in the form of a light beam that is pulse code modulated (PCM). A message is made up of a series of bits carrying binary values 1 and 0. The length of each bit is equal to the time t. Several types of coding are possible. In the Manchester modulation, for instance, a bit 0 comprises an obscurity period equal in duration to t/2 followed by an illumination period as long, whilst a bit 1 comprises an illumination period equal in duration to t/2 followed by an obscurity period as long. The invention may well be applied in a similar fashion to other types of coding, for instance, five bits-six bits code or CMI code.

Consequently, for example, the message emitted by the emitter $E_i$ of station $S_i$ is transmitted via the forward line $l_i$ to the receiver $R'_i$ in the concentration and switching central processor CSCP. In reference to FIGS. 2 and 3, each receiver $R'_i$ includes a photodetector $10_i$ such as a phototransistor or a photodiode which receives the light beam propagation on the respective optical line $l_i$. The photodetector $10_i$ is connected across the terminals of the input circuit of a current-voltage preamplifier $11_i$ having an output for deriving a voltage in terms of the current generated by the photodetector $10_i$.

The output preamplifier $11_i$ is connected to the input of a clock and data recovering circuit $12_i$. Circuits such as these are well known. Indeed, numerous circuits for clock recovery in an asynchronous and synchronous mode information transmission have already been disclosed. However, to permit clock recovery and to avoid using an additional line for transmitting the synchronization signals, the code for emitted messages is selected as self-synchronizing. The aforementioned codes satisfy this criterion.

Once the clock signal has been recovered, the information is fed into the input of a heading recognizing and detecting circuit $13_i$. A heading is a status word accompanying each message and preceding the useful data in the message. This heading can constitute an urgency, a priority level, an information indicating the message type, the length of this message, the addressee, the origin, etc. It can be formed of one or more words. The headings leaving the n headings recognizing and detecting circuits $13_1$ to $13_n$ are fed into n inputs $150_1$ to $150_n$ of a control processor 15. This processor 15 applies these headings either as is, or modified, or reconstituted in terms of the application, to the input 160 of a heading register 16. Indeed, the processor 15 can control fragmentation of the message, repetition of said message, an ancillary device should an error or another phenomenon be detected, and modify the information of this heading. Message switching toward a heirarchized or federate system can also be controlled by this processor 15 as will be made clearer hereinafter.

The heading recovering and detecting circuits $13_1$ to $13_n$ deliver the useful information to the inputs $140_1$ to $140_n$ of n registers $14_1$ to $14_n$. The processor 15 delivers a reading clock signal H to the registers $14_1$ to $14_n$ via wires $141_1$ to $141_n$ to control the extraction of data from said registers. The reading clock signal in accordance with the invention has a high frequency 20 to 40 MHz or more for instance. A register 17 receives the data derived from the registers $14_1$ to $14_n$ and introduces a heading ET which corresponds to the extracted data message; heading ET is coupled to wire 161 from the heading register 16 at the rythm of the signal H applied from the processor 15 via a wire 162. The heading ET can be inserted either at the beginning of the message, in the middle of a fragmented message, or at any predetermined position. The register 17 serially transmits the various messages derived from the n registers $14_1$ to $14_n$ to the output of the concentration and switching central processor CSCP, via the input of a transcoding circuit 18.

Figure 3:
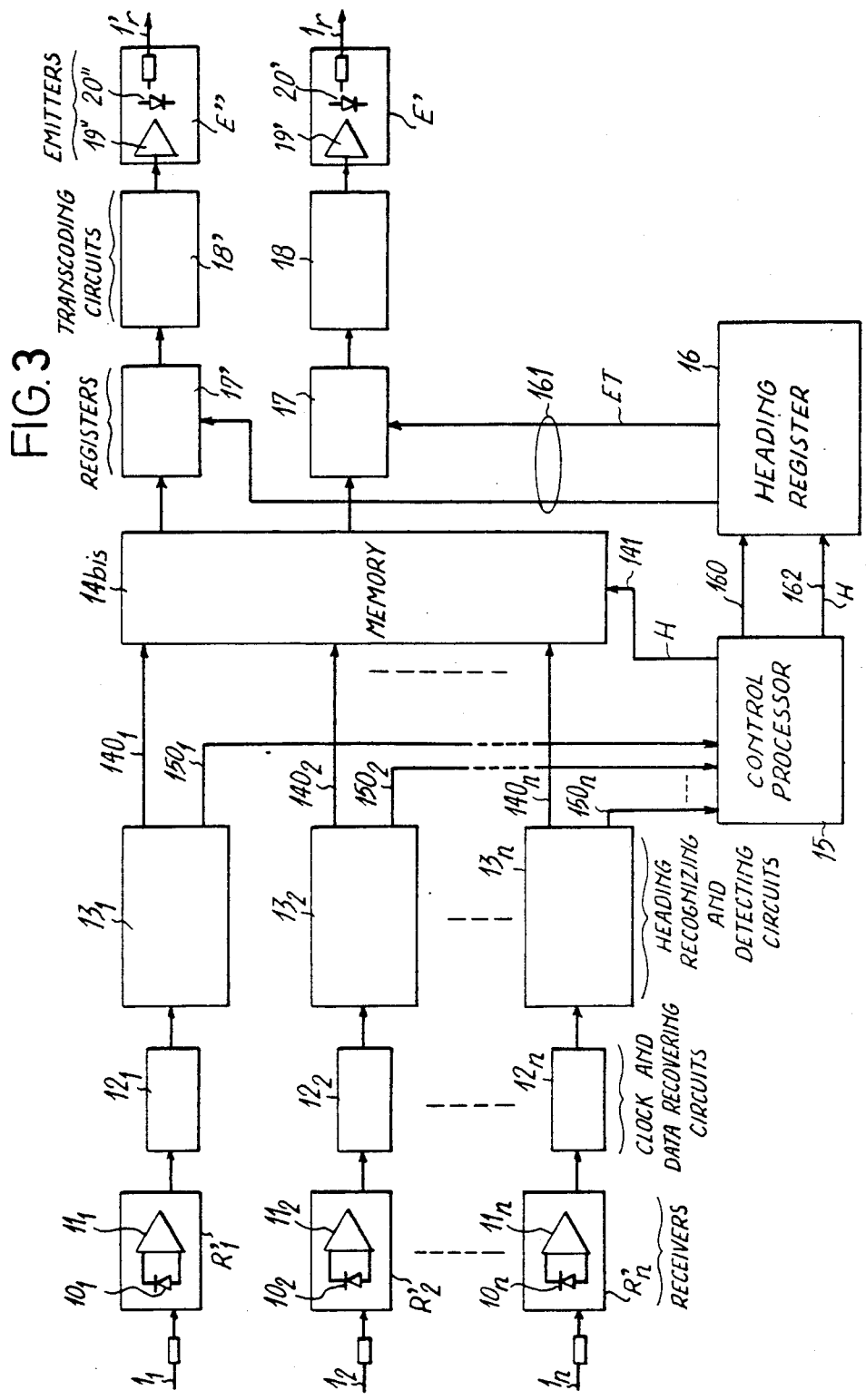
FIG. 3 is a variant of FIG. 2.

It will be observed that the n data registers $14_1$ to $14_n$ are first-in, first-out memories (FIFO) or any other RAM memories capable of storing the incoming data emitted by the respective subscriber stations. However, these n RAM memories can be replaced by a RAM memory 14 bis common to the n forward lines, as depicted in FIG. 3. The circuit 18 receives the information from the register 17 and transcodes these serialized data so they are compatible with the emitter E'. Indeed, a single emitter E' in the concentrating and switching central processor (CSCP) is sufficient. Emitter E' essentially comprises a preamplifier 19 followed by a photo-emission element 20 such as a laser diode or an LED diode which emits a light beam that is incident on the entrance end of an optical fiber forming the high bit-rate backward line $l_r$ to the receivers $R_1$ to $R_n$ of the subscriber stations $S_1$ to $S_n$.

Choosing the backward line bit rate of line $1_r$ depends primarily on the number of subscriber stations $S_1$ to $S_n$ connected to the concentrating and switching central processor CSDP and on the bit rate in each of these equipment items. The backward line is chosen such that the simultaneous bit rates taken as a whole over these various equipment items may flow with a very comfortable useful occupation rate margin. In practice, a bit rate over the backward line of around 20 Mbit/s to 40 Mbit/s or more is adopted.

It will be noted that the transcoding circuit 18 transcodes the data on the backward line $l_r$ in terms of a code which generally is different from the code utilized over the various forward lines $l_1$ to $l_n$.

The reception of information as described here for the n stations $S_1$ to $S_n$ is asynchronous. Indeed, this arrangement provides the widest operational flexibility. The system would, however, also be applicable to a synchronous message transmission.

A further advantage of the system based on a backward line managed by the processor CSCP and distributed to the stations resides in recognizing the priority reigning over the incoming message and in modifying the retransmission order thereof after modifying the message headings when necessary. The processor CSCP exercises an urgency, priority, bit-rate compromise for traffic flow.

A modification regarding the headings may also be advantageous in the event of data dating.

The optical pluribus embodying the invention affords numerous advantages in transmitting messages between subscriber stations. The time division multiple access is carried out in the CSCP processor itself and along the backward line; this is in contrast to the time division multiple access that was performed by the optical bus in the prior art. Such a transmission mode protects against scrambling, should a subscriber station incur a failure and emit erroneous messages. Furthermore, it provides self-control in each station through comparison of the message emitted along the respective forward line against that received by the backward line as will become clear from the subscriber station description.

FIG. 3 is a circuit diagram of a concentrating and switching central processor CSCP which retransmits the messages along two backward lines $l_r$ and $l'_r$. Let it be supposed that for bit-rate, redundancy or other reasons, a second backward line $l'_r$ is necessary. With this in mind, the processor 15 extracts from the memory 14 bis in FIG. 3 information which is applied partly to the input of the register 17 and partly to the input of a register 17'; memory 14 bis furnishes messages with their headings. Likewise, a transcoding circuit 18' performs the desired coding at the output of the register 18'. The information signals are then emitted along backward lines $l_r$ and $l'_r$ through the emitter E' and an emitter E''. It will be noted that the second backward line $l'_r$ may have a rate differing from that in the line $l_r$ depending on the number of addressee subscriber stations served.

In the embodiment as depicted in FIG. 3, the RAM memory 14 bis could, further, contain the headings in which case the processor 15 would process these headings by writing or reading directly into this memory, thereby doing away with the register 16.

Figure 4:
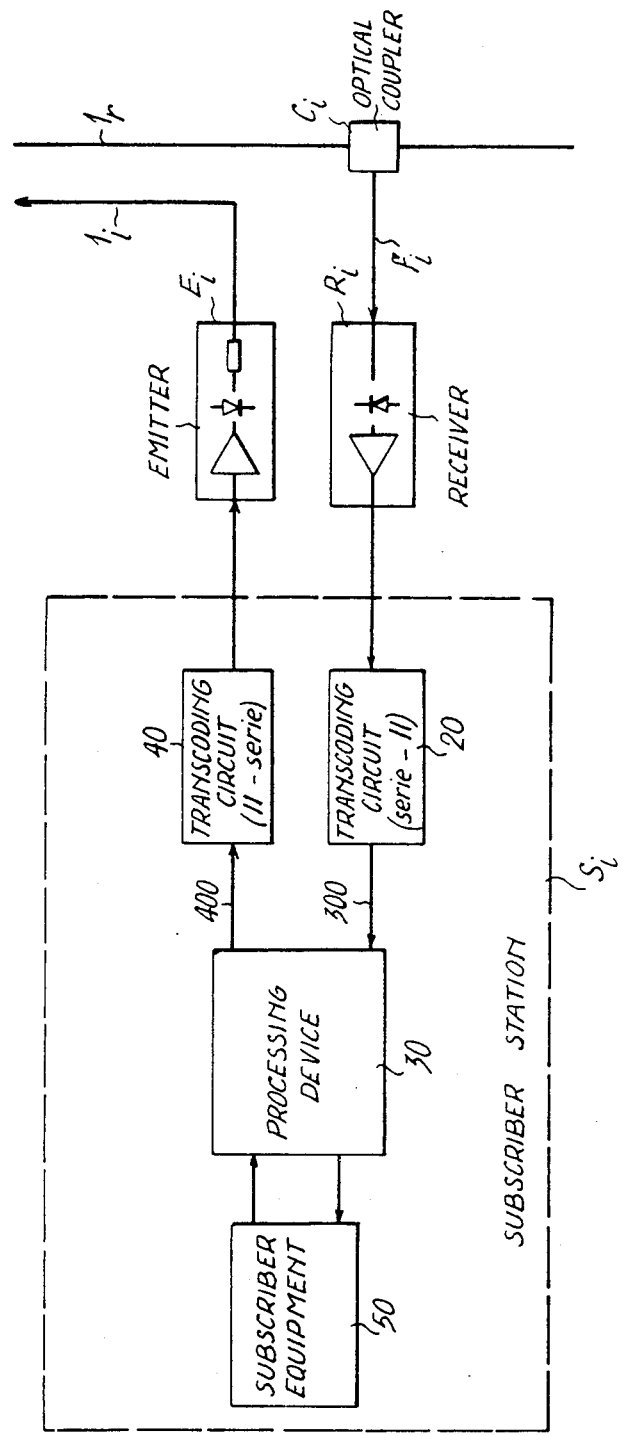
FIG. 4 is a block diagram of a subscriber station of FIG. 1.

FIG. 4 is a block diagram of an embodiment of a subscriber station $S_i$ likely to emit messages toward a processor CSCP by means of its respective forward line $l_i$ and receive the messages conveyed by the backward line $l_r$. The receiver $R_i$ of station $S_i$ is connected to the backward line $l_r$ by means of a connection fiber $f_i$ which is coupled to the line $l_r$ via an optical coupler $C_i$. The receiver $R_i$ chiefly comprises a photodetector such as a photodiode or a phototransistor, that is connected across the terminals of a current-voltage preamplifier. The receiver $R_i$ delivers electrical pulses in series to the input of a transcoding circuit 20. The circuit 20 essentially performs a decoding operation on the received informations, a series-to-parallel conversion of the received signal and a check of its parity. The signal derived from the circuit 20 is applied to an input 300 of a processing device 30. The device 30 essentially comprises a message reception table and a message emission table. Based on the headings, the message reception table recognizes, on the one hand, the messages emitted by the station $S_i$, and on the other hand, the messages that are transmitted from other stations to the station $S_i$. A comparator inserted in the device 30 verifies, by straightforward comparison of the message received against the emitted message contained in the emission table, the transmission quality for any message. The comparator can then validate the message and delete said message from the two tables.

Similarly, the processing device 30 includes a message emission table where the information signals to be emitted on the forward line $l_i$ are stored and where the headings of the emitted information signals are prepared in accordance with the pluribus organization. The information signals derived from the emission table with completed headings are therefore fed into the input 400 of a transcoding circuit 40 for encoding the message, verifying the parity of said message and performing a parallel-to-series conversion. Then the message derived from the circuit 40 undergoes an electrical-optical conversion, provided by emitter $E_i$ that, for instance, includes a diode LED which transmits the light message along the forward line $l_i$.

The processing device 30 as a result of its two emission and reception tables makes it possible to receive and emit the message in perfect asynchronism with a subscriber equipment 50 of the station $S_i$.

Links, not illustrated, between the equipment 50 and the processing device 30 permit information exchange management, information transfer interruption or any error to be made known. The device 30 is responsible for managing the pluribus transmission, holding in memory or repeating any erroneous message or message not received by the processor CSCP, and advising the processor CSCP that the station $S_i$ is ready to receive messages. To sum up, the device 30 monitors message transmission.

The device 30 may also be simplified without changing the message transmission mode of the invention. Indeed, if the self-control regarding messages contained in the emission and reception tables is not necessary, the subscriber station results in being lightened. This is generally the case when the emission tables are in the subscriber equipment.

In the event of message multirouting, the device 30 can further provide for grouped addresses or single addresses. Such an embodiment is of particular interest when the pluribuses are hierarchized as will be explained hereinafter.

The invention opens the way to many configurations due to the absence of constraints on the backward line.

Figure 5:
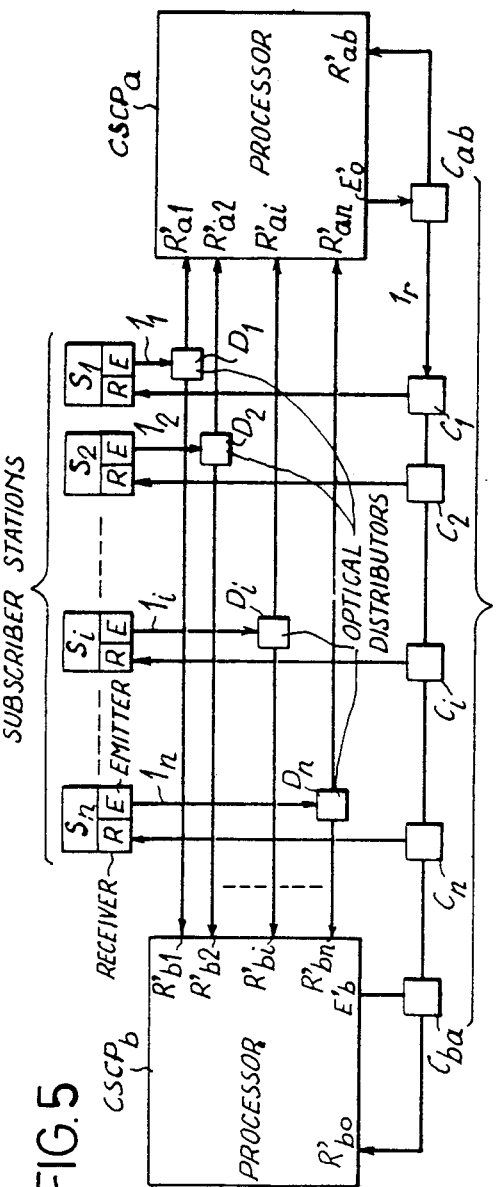
FIG. 5 is a block diagram of a relieved system including the processor illustrated in FIG. 1 and a spare processor.

In reference to FIGS. 4 and 5, a particularly advantageous embodiment of the invention makes it possible to relieve the transmission by doubling up the concentrating and switching central processor CSCP. In this fashion, two processors $CSCP_a$ and $CSCP_b$ are located at separate well spaced-out positions. The messages delivered by the emitter $E_i$ of subscriber stations $S_i$ are received by receivers $R'_{ai}$ and $R'_{bi}$ that are respectively included in the processors $CSCP_a$ and $CSCP_b$ and are of the type described according to FIG. 2. An optical distributor $D_i$ splits the light beam that is emitted by station $S_i$, between forward lines that are connected to the receivers $R'_{ai}$ and $R'_{bi}$ of the processors $CSCP_a$ and $CSCP_b$.

FIG. 5 however, depicts an embodiment including just one distributed backward line $l_r$, on which the information signals are emitted either by the emitter $E'_a$ of the processor $CSCP_a$ or emitter $E'_b$ of the processor $CSCP_b$, only one of which is active. Indeed, the backward line $l_r$ is common to the two processors $CSCP_a$ and $CSCP_b$; it is connected for the direction from the processor $CSCP_a$ to the processor $CSCP_b$, to the emitter $E'_a$ of processor $CSCP_a$ and an additional receiver $R'_{ba}$ of processor $CSCP_b$ via a coupler $C_{ab}$, couplers $C_1$ to $C_n$ and a coupler $C_{ba}$, and it is connected for the other direction from the processor $CSCP_b$ to the processor $CSCP_a$ to the emitter $E'_b$ of processor $CSCP_b$ and an additional receiver $R'_{ab}$ of processor $CSCP_b$ via couplers $C_{ba}$, $C_n$ to $C_1$ and $C_{ab}$.

The processor $CSCP_b$ thus in a relieving position receives, like a subscriber station, the entire message at high rate; processor $CSCP_b$ compares the high-rate backward line message received by the receiver $R'_{ba}$ with the messages received by its own receivers $R'_{b1}$, $R'_{b2}$, ... $R'_{bi}$, ... $R'_{bn}$. If it is assumed that the message emitted along the backward line by the processor $CSCP_a$ is erroneous, then a predetermined procedure makes it possible to inform the processor $CSCP_b$ along the same backward line $l_r$ that it should take over. The processor $CSCP_b$ then emits messages distributed to the subscriber stations $S_1$ to $S_n$ along the same backward line $l_r$ through its emitter $E'_b$. On a reciprocal basis, the processor $CSCP_a$ acts as safe circuit and receives, via its receiver $R'_{ab}$, the high-rate backward line message emitted by the processor $CSCP_b$.

Figure 6:
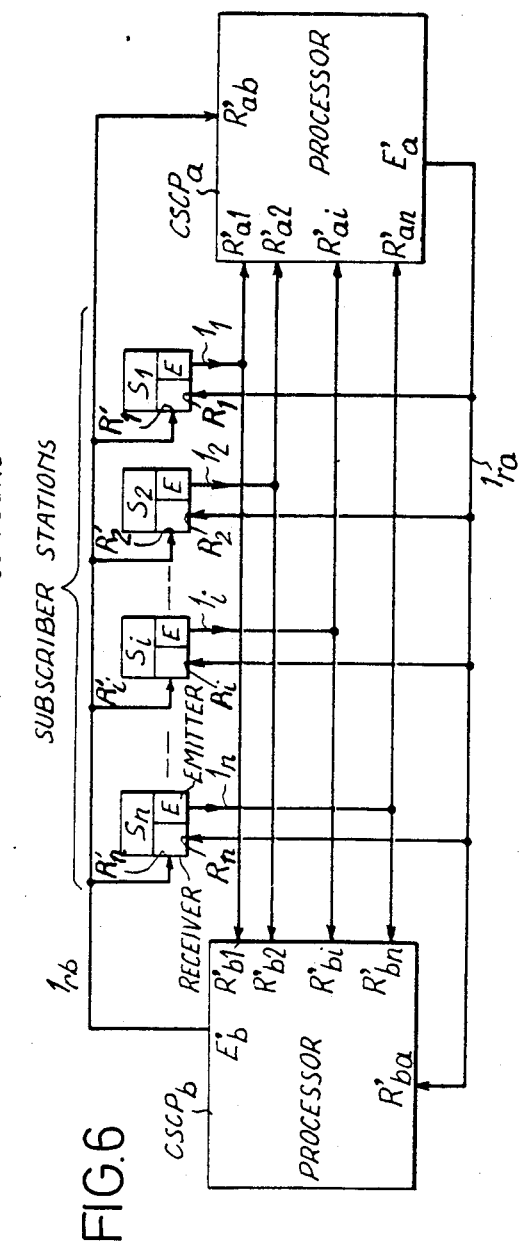
FIG. 6 is a variant of FIG. 5 with two backward lines.

FIG. 6 like FIG. 5 depicts a pluribus relieved by doubling up the processor CSCP but with independent backward lines $l_{ra}$ and $l_{rb}$.

The backward line $l_{ra}$ links the emitter $E'_a$ of processor $CSCP_a$ to the receiver $R'_{ba}$ of processor $CSCP_b$ and to first receivers such as $R_1$ to $R_n$ of the subscriber stations $S_1$ to $S_n$. The backward line $l_{rb}$ links the emitter $E'_b$ of processor $CSCP_b$ to receiver $R'_{ab}$ of processor $CSCP_b$ and to second receivers such as $R_1$ to $R_n$ of subscriber stations $S_1$ to $S_n$. Dots will be adopted in FIG. 6 and in the description hereinafter to represent optical distributors and couplers. As a result, in FIG. 6, each subscriber station $A_i$ emits toward the respective receivers $R'_{bi}$ and $R'_{ai}$ of processors $CSCP_a$ and $CSCP_b$ by means of its emitter $E_i$.

If it is assumed that the processor $CSCP_a$ is active and the processor $CSCP_b$ is in relieving position, then the emitter $E'_a$ emits all the messages grouped together along the high-rate backward line $l_{ra}$ and distributes them to the subscriber stations. The receiver $R'_{ba}$ in relieving processor $CSCP_b$ also receives the messages from the line $l_{ra}$ and compares these messages against those received via its own receivers $R'_{b1}$ to $R'_{bn}$ connected directly along the pluribus forward lines. If it is supposed that the grouped message emitted along the backward line $l_{ra}$ is incorrect, then by means of a predetermined procedure, the processor $CSCP_b$ substitutes for the processor $CSCP_a$ and emits through its own emitter $E'_b$ along the other backward line $l_{rb}$.

Reciprocally, the processor $CSCP_a$ then goes into a relieving position. The subscriber stations do, however, in this embodiment, include a second receiver-not shown-for receiving the messages along the backward line $l_{rb}$.

The concentrating and switching central processors CSCP can thus be doubled or indeed tripled where these redundant processors can be located at relatively remote positions thereby reducing the simultaneous risk of physical interference in these items.

Figure 7:
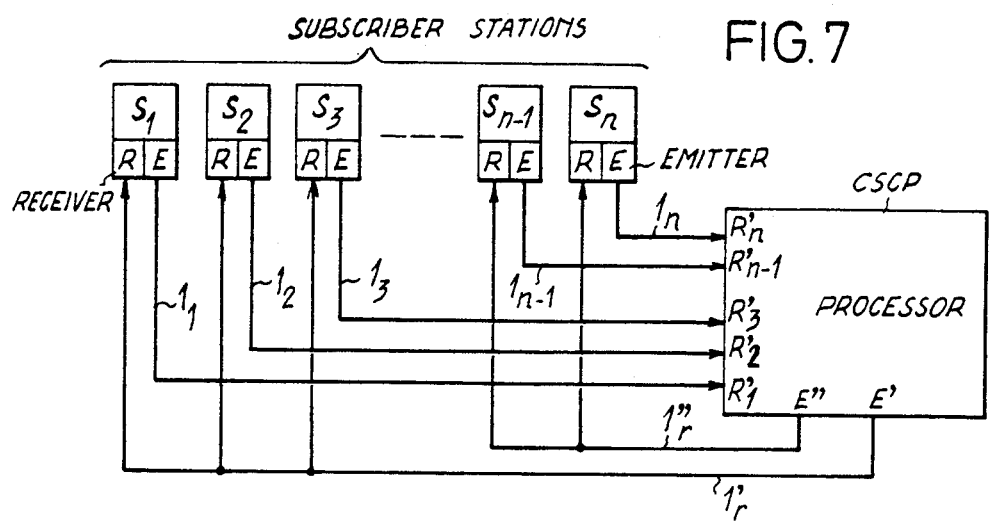
FIG. 7 is a variant of FIG. 1 with two distributed backward lines.

FIG. 7 is a block diagram of an optical pluribus arrangement embodying the invention that comprises two optical backward lines $l'_r$ and $l''_r$ that are distributed for subscriber stations $S_1$ to $S_n$ and connected to a single processor CSCP. It may be supposed that two given stations, e.g. $S_{n-1}$ and $S_n$ for urgency or priority reasons, must have wide accessibility in order to receive the information arriving from the other stations. The second backward line $l''_r$ is provided for solely connecting these two subscriber stations $S_n$ and $S_{n-1}$ to an additional individual emitter $E''$ in the processor CSCP. Contrary to the aforesaid, the $(n-2)$ other stations are connected to the emitter $E'$ in the same processor CSCP that emits the distributed information along the backward line $l'_r$. Such a layout may also be necessary for optical analysis purposes when the number of shunted stations in a line is too high. Here again, the control processor 15 of the processor CSCP is responsible for managing the information signals emitted by emitters $E'$ and $E''$ as mentioned in reference with FIG. 3.

Figure 8:
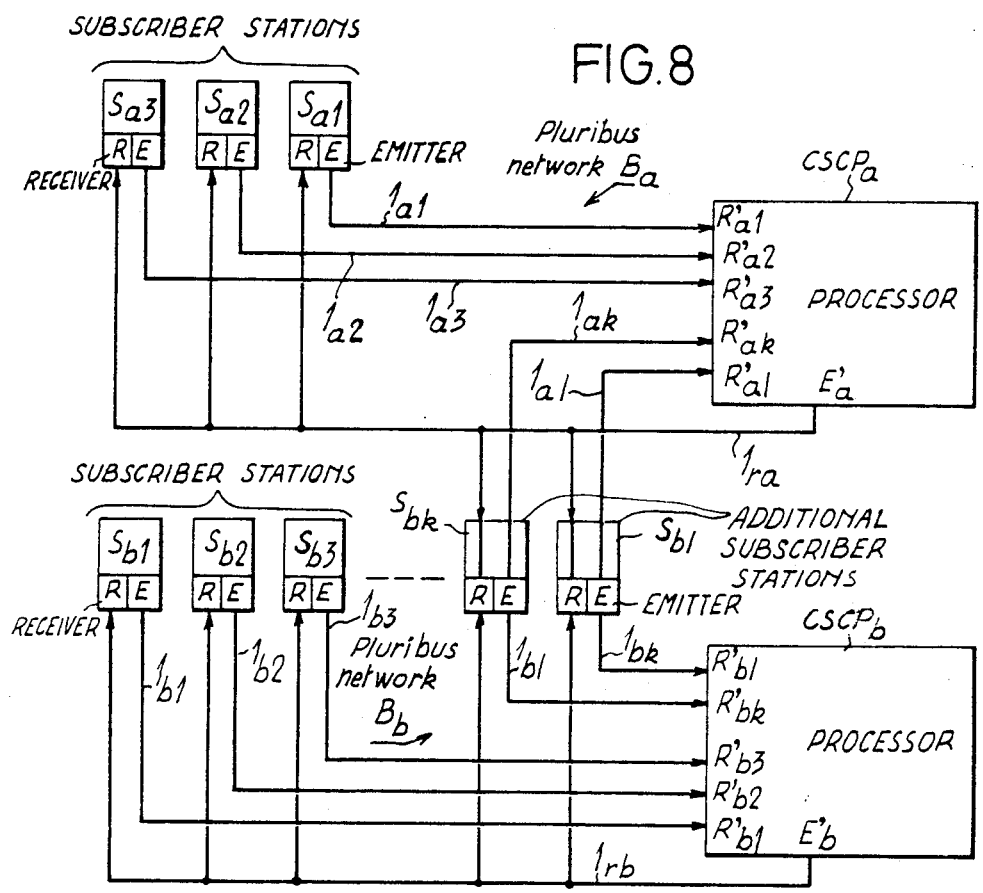
FIG. 8 is a block diagram of a system comprising two interconnected groups each including stations and a central processor.

FIG. 8 relates to an embodiment of the invention wherein two pluribus networks $B_a$ and $B_b$ are interconnected and each is formed of a respective number $P_a$, $P_b$ of subscriber stations and a respective individual central processor $CSCP_a$, $CSCP_b$. The processors $CSCP_a$ and $CSCP_b$ are not however independent. The first pluribus $B_a$ is connected for example to $P_a=3$ stations $S_{a1}$, $S_{a2}$, $S_{a3}$ which emit information signals that are transmitted by the individual forward lines $l_{a1}$, $l_{a2}$, $l_{a3}$ and received by means of receivers $R'_{a1}$, $R'_{a2}$ and $R'_{a3}$ of the processor $CSCP_a$. Coming the other way, the emitter $E'_a$ of processor $CSCP_a$ transmits the grouped informations to the receivers $R_{a1}$, $R_{a2}$, $R_{a3}$ of these three stations along the distributed backward line $l_{ra}$. The backward lines $l_{ra}$ conveys, however, in accordance with this embodiment, information signals intended for additional subscriber stations $S_{bk}$ and $S_{bl}$ of a second pluribus $B_b$. The two subscriber stations $S_{bk}$ and $S_{bl}$ are connected to pluribus $B_a$ by means of two first receivers in these two stations that are connected to the backward line $l_{ra}$ via optical distributors (not shown), and by means of two additional receivers $R'_{ak}$ and $R'_{al}$ in the processor $CSCP_a$ via two emitters in these two stations and via two additional optical forward lines $l_{ak}$ and $l_{al}$.

The second pluribus $B_b$ links, for example, the emitters of $P_b=3$ subscriber stations $S_{b1}$, $S_{b2}$, $S_{b3}$ to receivers $R'_{b1}$, $R'_{b2}$, $R'_{b3}$ in the processor $CSCP_b$ via forward lines $l_{b1}$, $l_{b2}$, $l_{b3}$. The subscriber stations $S_{b1}$, $S_{b2}$, $S_{b3}$ receivers respond to the information signals propagating in the backward direction on single distributed backward line $l_{rb}$ as emitted from the emitter $E'_b$ in the processor $CSCP_b$. Each of stations $S_{bk}$ and $S_{bl}$ includes a second receiver R connected to the distributed backward line $l_{rb}$. The single emitters E in each of stations $S_{bk}$ and $S_{bl}$ are also connected to respective additional receivers $R'_{bk}$, $R'_{bl}$ in the processor $CSCP_b$ via respective additional optical forward lines $l_{bk}$, $l_{bl}$. Emitter E is intended to emit as well to the processor $CSCP_a$ via the respective line $l_{ak}$, $l_{al}$ as to the processus $CSCP_b$ via the respective line $l_{bk}$, $l_{bl}$.

Figure 9:
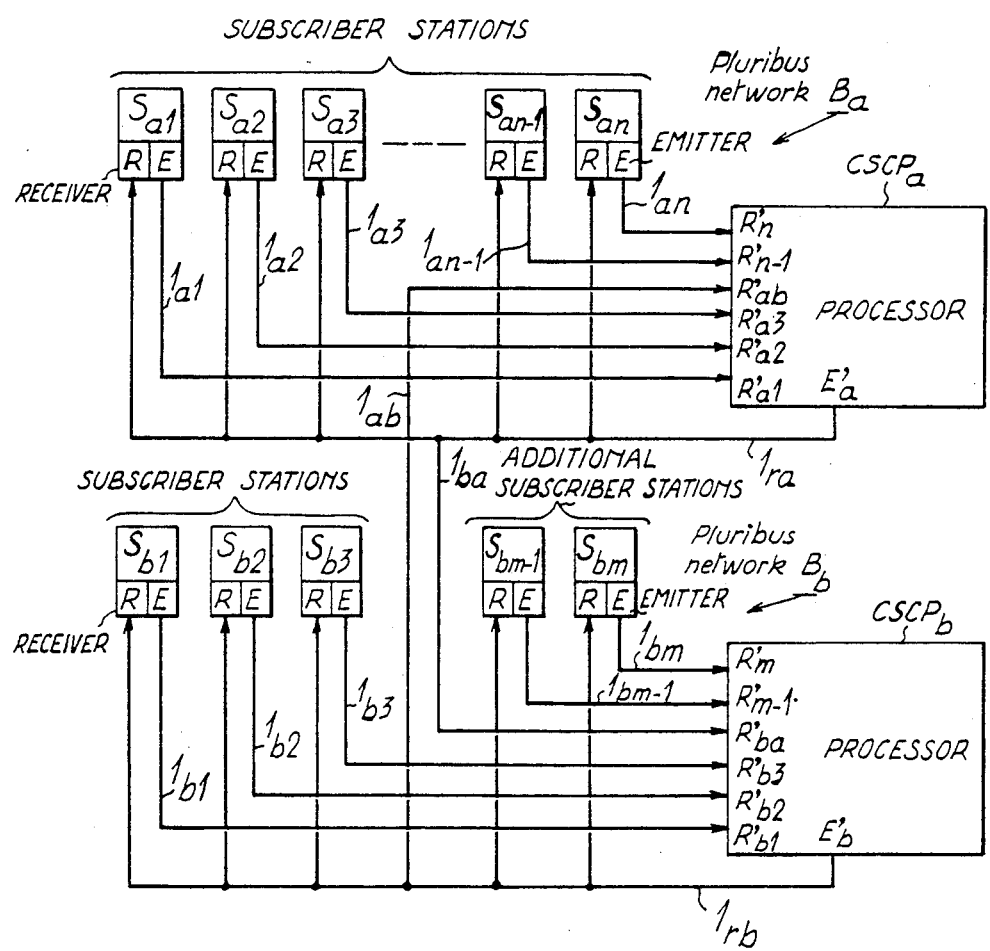
FIG. 9 is a variant of FIG. 8 including two federate pluribuses.

FIG. 9 concerns a particular embodiment of two called federate pluribus networks $B_a$, $B_b$. If the first pluribus $B_a$ comprises n subscriber stations $S_{a1}$ to $S_{an}$ that are connected to a processor $CSCP_a$ by means of n forward lines $l_{a1}$ to $l_{an}$ and one distributed backward line $l_{ra}$ and if the second pluribus $B_b$ comprises m subscriber stations $S_{b1}$ to $S_{bm}$ that are connected to a processor $CSCP_b$ by means of m forward lines $l_{b1}$ to $l_{bn}$ and one distributed backward line $l_{rb}$, then the two pluribuses are termed federate if they intercommunicate via their backward line. Indeed, FIG. 8 related to a communication between two pluribuses via at least an additional forward line ascribed to a subscriber station desirous of communicating with the other pluribus.

According to the embodiment of FIG. 9, the backward line in each of the two pluribuses $B_a$, $B_b$ is also distributed to the other pluribus $B_b$, $B_a$. The information signals on the backward line $l_{ra}$ are received in an additional receiver $R'_{ba}$ in the processor $CSCP_b$ via a connection forward line $l_{ba}$, whilst the information signals on the backward line $l_{rb}$ are received in an additional receiver $R'_{ab}$ in the processor $CSCP_a$ via a connection forward line $l_{ab}$. Each processor $CSCP_a$, $CSCP_b$ receives the message from the other pluribus $B_b$, $B_a$ as if it were a typical subscriber station and re-emits the messages after discrimination along its own backward lines $l_{ra}$, $l_{rb}$. The particular stations $S_{a1}$ to $S_{an}$, $S_{b1}$ to $S_{bm}$ concerned with the message from the other pluribus $B_b$, $B_d$ recognizes the heading and receives the message ascribed to it.

Figure 10:
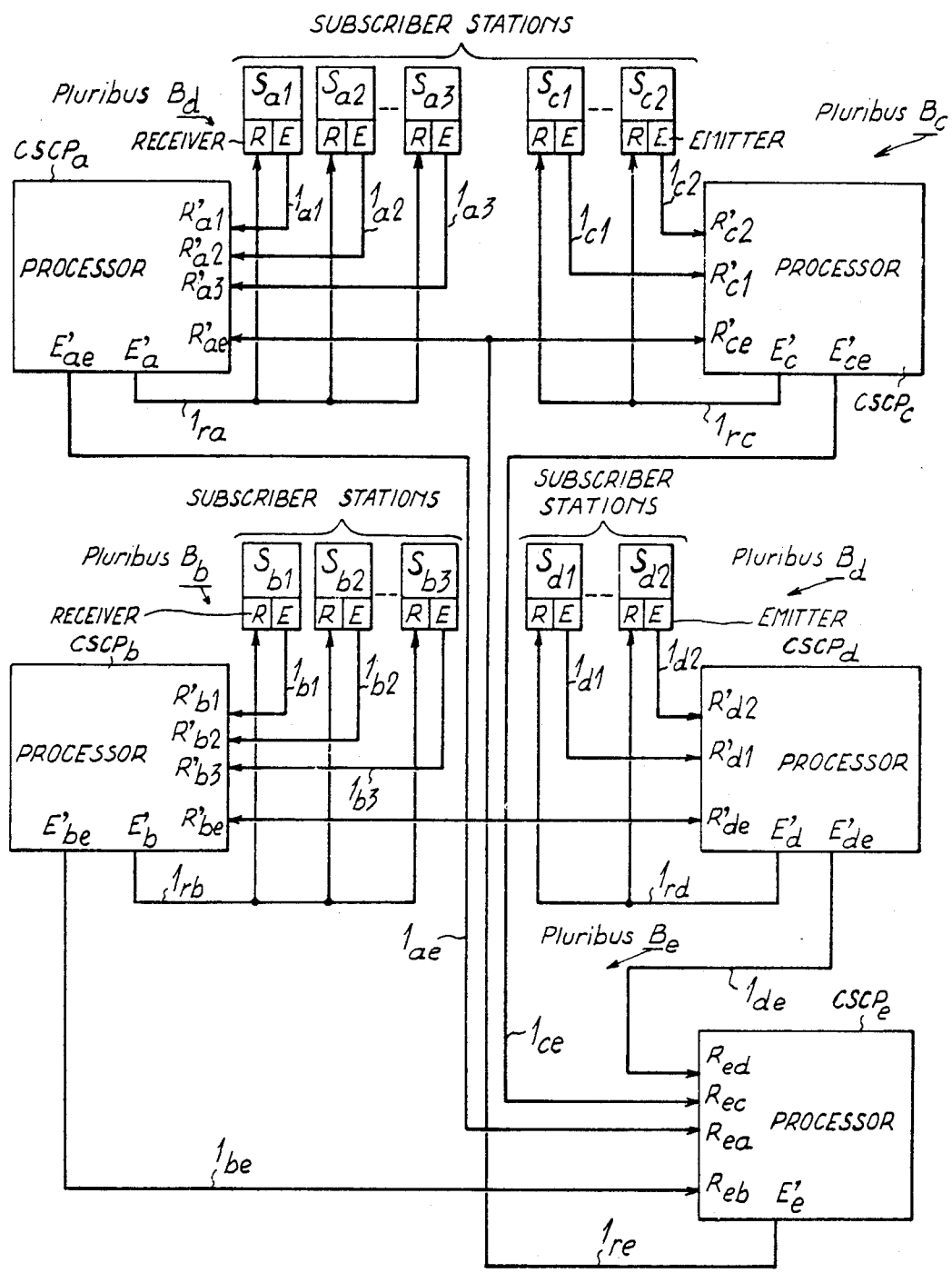
FIG. 10 is a block diagram of system with hierarchization of station groups.

FIG. 10 is a block diagram of a further embodiment of the invention in which there is a hierarchy of pluribus networks. In fact, the pluribuses $B_a$, $B_b$, $B_c$, $B_d$ cannot intercommunicate directly via the stations connected to them as in FIG. 8 nor via the concentrating and switching central processors $CSCP_a$, $CSCP_b$, $CSCP_c$, $CSCP_d$ as in FIG. 9 but rather via an additional pluribus $B_e$ and an additional processor $CSCP_e$. In FIG. 10 are provided four pluribuses $B_a$, $B_b$, $B_c$ and $B_d$, each of which bidirectionally links respective subscriber stations $S_{a1}$, $S_a$, $S_{a3}$; $S_{b1}$, $S_{b2}$, $S_{b3}$; $S_{c1}$, $S_{c2}$; $S_{d1}$, $S_{d2}$ to a respective processor $CSCP_a$, $CSCP_b$, $CSCP_c$, $CSCP_d$ through respective individual forward lines $l_{a1}$, $l_{a2}$, $l_{a3}$; $l_{b1}$, $l_{b2}l_{b3}$; $l_{c1}$ $l_{c2}$; $l_{d1}$, $l_{d2}$ and a respective common backward line $l_{rd}$, $l_{rb}$, $l_{rc}$, $l_{rd}$. Thus, receivers $R'_{a1}$, $R'_{a2}$ and $R'_{a3}$ in the processor $CSCP_a$ receive informations emitted from respective stations $S_{a1}$, $S_{a2}$ and $S_{a3}$, and the emitter $E'_a$ of the processor $CSCP_a$ sends the information back along the respective high-rate backward line $l_{ra}$ to stations $S_{a1}$, $S_{a2}$ and $S_{a3}$. Similarly, the other processors $CSCP_b$, $CSCP_c$, $CSCP_d$, communicates with their respective subscriber stations via their individual forward lines and their common backward line.

Assume that a certain number of information items gathered by a station such as station $S_{a2}$ of the pluribus $B_a$, has interested another station, such as station $S_{d2}$ of another pluribus $B_d$.

In FIG. 10, there is no direct transmission from one pluribus to the other; instead there is a transmission via a so-called higher order pluribus $B_e$. Such an arrangement is termed hierarchization. All the information signals from one low order pluribus $B_a$, $B_b$, $B_c$, $B_d$ intended for another low order pluribus are oriented and transmitted to the high order pluribus $B_e$ which returns them to the other low order pluribuses along another common high rate backward line.

The pluribus $B_e$ includes four forward lines $l_{ae}$, $l_{be}$, $l_{ce}$, $l_{de}$ that link respectively emitters $E'_{ae}$, $E'_{be}$, $E'_{ce}$, $E'_{de}$ in the processors $CSCP_a$, $CSCP_b$, $CSCP_c$, $CSCP_d$ to receivers $R_{ea}$, $R_{eb}$, $R_{ec}$, $R_{ed}$ in the processor $CSCP_e$, and a common distributed backline line $l_{re}$ that links an emitter $E'_e$ in the processor $CSCP_e$ to receivers $R'_{ae}$, $R'_{be}$, $R'_{ce}$, $R'_{de}$ in the processors $CSCP_a$, $CSCP_b$, $CSCP_c$, $CSPD_d$. Looking again at the above example of the station $S_{a2}$ in the pluribus $B_a$ and the station $S_{d2}$ in the pluribus $B_d$ which wish to exchange information signals, the emitter $E'_{ae}$ of the processor $CSCP_a$ communicates with the receiver $R_{ea}$ of the high order central processor $CSCP_e$. Likewise, each pluribus $B_b$, $B_c$, $B_d$ communicates with the high other pluribus $B_e$ by means of the respective emitters $E'_{be}$, $E'_{ce}$, $E'_{de}$ and the respective receivers $R_{eb}$, $R_{ec}$, $R_{ed}$ for all the messages sent from its respective stations and not intended for these stations. Each low order processor $CSCP_a$, $CSCP_b$, $CSCP_c$, $CSCP_d$ acts as a subscriber station for the high order pluribus $B_e$. The "outside" emitting line $l_{ae}$, $l_{be}$, $l_{ce}$, $l_{de}$ of pluribuses $B_a$, $B_b$, $B_c$, $B_d$ may also be a high rate optical line.

Figure 2:
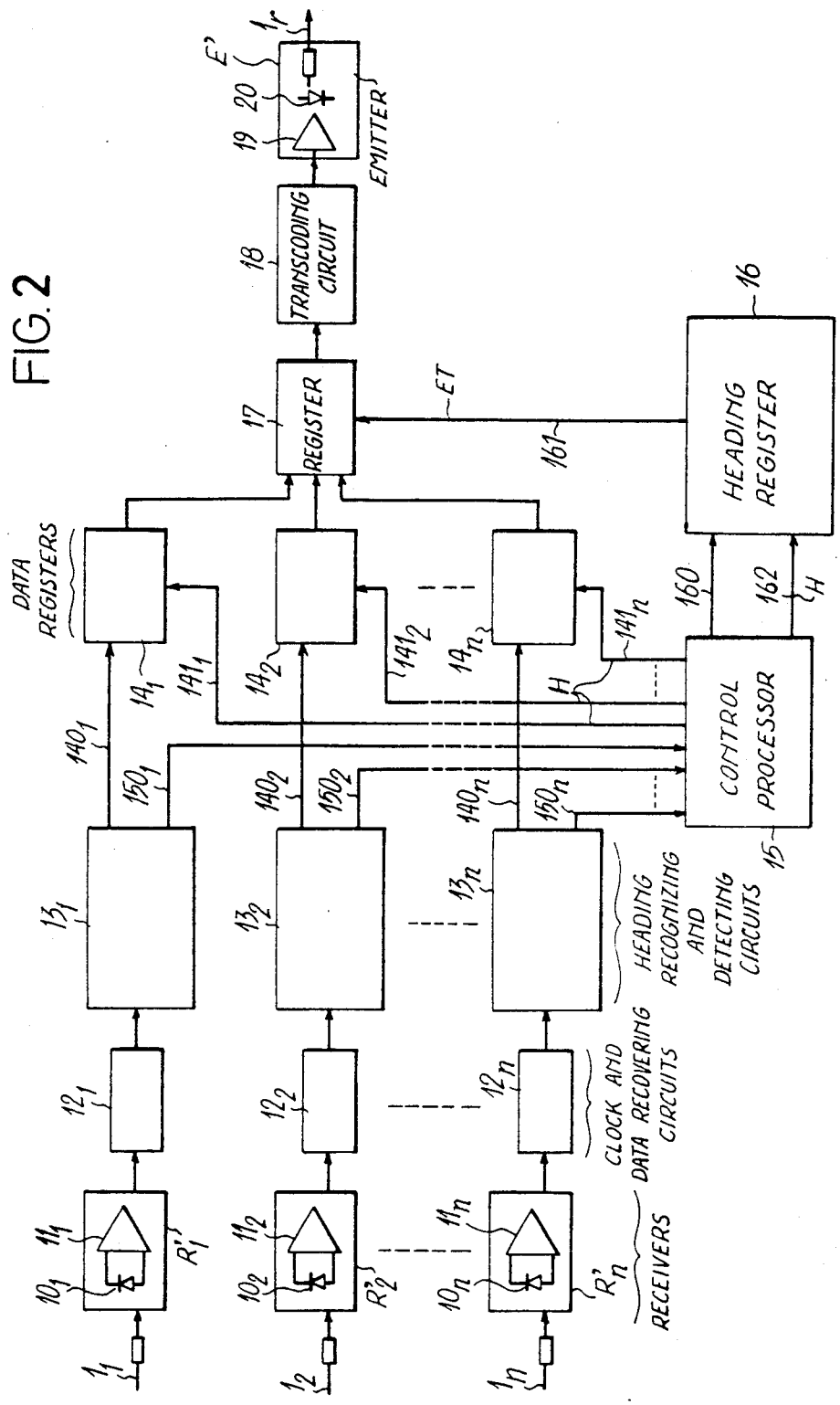
FIG. 2 is a block diagram of the concentration and switching central processor (CSCP) in FIG. 1.

The high order processor $CSCP_e$, also arranged as described in reference with FIGS. 2 and 3, delivers the information at the output of its emitter $E'_e$ along the high-rate backward line $l_{re}$ to all the low order pluribuses. Each pluribus $B_a$, $B_b$, $B_c$, $B_d$ receives via the respective receiver $R'_{ae}$, $R'_{be}$, $R'_{ce}$, $R'_{de}$ the information signals supplied to it by the pluribus $B_e$, recognizes the signals intended for it through the headings of the information signals and retransmits a signal to its respective backward line $l_{ra}$, $l_{rb}$, $l_{rc}$, $l_{rd}$ the information signals intended for its subscriber station.

In the embodiment shown in FIG. 10, the high order pluribus is connected only to low order pluribuses. It would, however, further be possible for simple subscriber stations to be directly connected to the high order pluribus $B_e$.

Figure 11:
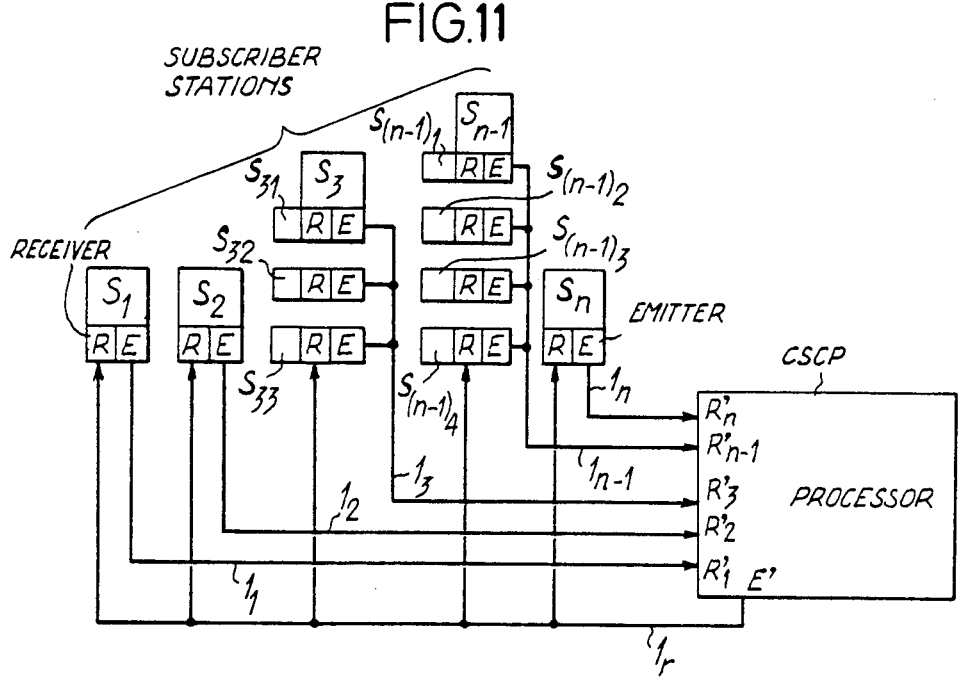
FIG. 11 is a variant of FIG. 1 with shared-emission forward lines.

FIG. 11 is a block diagram of an optical pluribus embodiment with a shared emission line. As in FIG. 1, the n subscriber stations $S_1$ to $S_n$ are connected to a connecting and switching central processor CSCP by means of individual forward lines $l_1$ to $l_n$ and a common backward line $l_r$. Certain stations can, however, be made up of a group of several subscriber substations. In this spirit, the station $S_3$ is constituted by a group of three subscriber substations $S_{31}$, $S_{32}$ and $S_{33}$ and the station $S_{n-1}$ is constituted by a group of four subscriber substations $S_{(n-1)1}$, $S_{(n-1)2}$, $S_{(n-1)3}$ and $S_{(n-1)4}$. Each subscriber substation has an emitter and a receiver. The information signals delivered from the substations in a station such as station $S_3$, $S_{n-1}$ are emitted in turn in terms of how one and the same fiber $l_3$, $l_{n-1}$ is occupied and received by the same receiver $R'_3$, $R'_{n-1}$ in the processor CSCP. An internal protocol can facilitate the emission duration and the emission period of each subscriber substation included in the same station. These subscriber substations in a same station are advantageously chosen close to each other.

Figure 12:
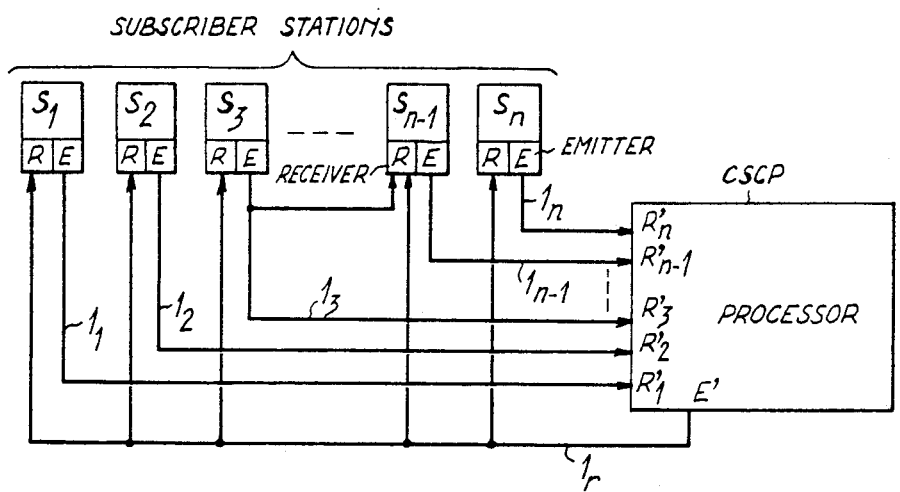
FIG. 12 is a variant of FIG. 1 in which the optical pluribus is relieved by means of specific redundancy.

FIG. 12 is an illustration of an embodiment with specific redundancy. As illustrated in FIG. 1, n stations $S_1$ to $S_n$ are connected to the same processor CSCP by means of an optical pluribus formed of n forward lines $l_1$ to $l_n$ and a single distributed backward line $l_r$. In FIG. 12, the station $S_{n-1}$ receives information from the station $S_3$ that is directly connected to the station $S_{n-1}$- without going via the optical pluribus-by means of a simple optical fiber, an optical distributor at the output of the emitter of station $S_3$ and a second receiver included in station $S_{n-1}$. This redundancy can be particularly interesting when it relieves a priviledged transmission from station $S_3$ to station $S_{n-1}$.

Figure 13:
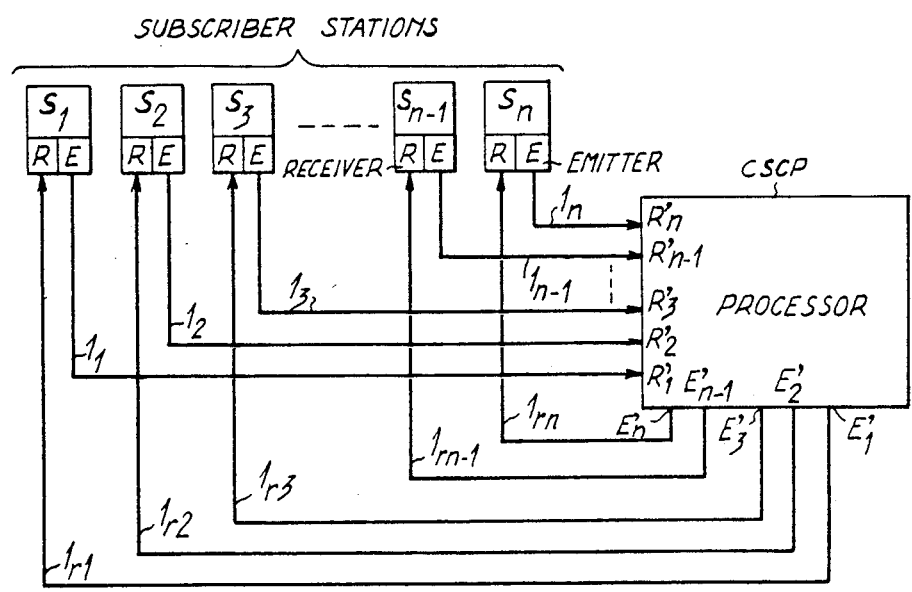
FIG. 13 is a variant of FIG. 1 with redundancy in the backward line.

FIG. 13 is a block diagram of a system analogous to that in FIG. 1, but includes a pluribus carrying a multitude of high rate backward lines $l_{r1}$ to $l_{rn}$ which are connected to emitters $E'_1$ to $E'_n$ in the processor CSCP respectively. Thus, if n subscriber station are connected to the processor CSCP, they may be envisioned as n individual backward lines on which the message are again a superposition of the messages emitted by all the stations. Such an arrangement endows redundancy on the pluribus backward line.

Figure 14:
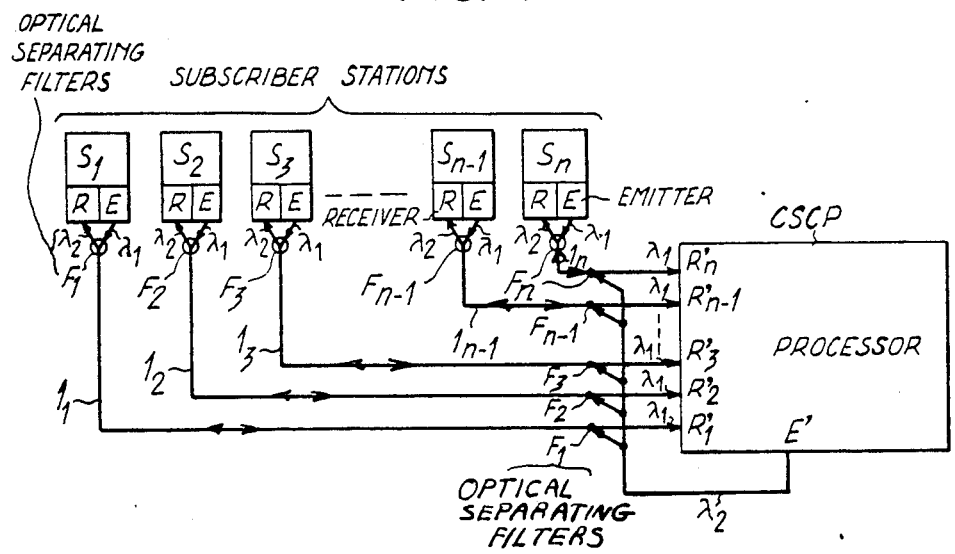
FIG. 14 is a variant of FIG. 1 with wavelength-division multiplexing.

The embodiment shown in FIG. 14 is a variant of the embodiment shown in FIG. 1. Indeed, each subscriber station $S_1$ to $S_n$ is connected to the processor CSCP by means of an individual forward line $l_1$ to $l_4$ which is also intended as backward line for the subscriber station. Indeed, the messages are multiplexed in wavelength along one and the same optical fiber, a wavelength $\lambda_1$ is chosen for the emission from a station to the processor CSCP and a wavelength $\lambda_2$ is chosen for the reception from the processor CSCP to a station. Pairs of optical separating filters $F_1$ to $F_n$ are provided at the ends of the bidirectional lines $l_1$ to $l_n$ for achieving wavelength separation so that emitters of the stations and the receivers $R'_1$ to $R'_n$ of the processor CSCP operates at the wavelength $\lambda_1$ and so that the emitter $E'$ of the processor CSCP and the receivers of the stations operate at the other wavelength $\lambda_2$.

Further arrangements-not shown-of the pluribus stemming from various combinations of invention embodiments may be made within the scope of the appended claims.

The invention could apply in particular to distributed data processing and bureautics.

What we claim is:

1. A digital distributed information signal transmitting system comprising:
   plural stations,
   an optical transmission medium,
   means interconnected to said stations via said medium for managing information signal exchanges between said stations, each station being fit to transmit information signals to every other station and itself and to receive information signals from every other station and itself through said managing means,
   each station including an optical information signal emitter and an optical information signal receiver,
   said managing means including: plural optical signal receiving means for converting said optical information signals derived by said station emitters into corresponding electric information signals for the optical information signal emitted by each of said stations, means for processing said electric station information signals to form a combined electric information signal, and a single optical emitting means for converting said combined electric information signal into a combined optical information signal to be distributed to all of said station receivers,
   said optical transmission medium comprising: plural unidirectional optical forward lines, each of said forward lines being connected to unidirectionally carry one of said optical information signals from one of said station emitters to one of said receiving means in said managing means, a different forward line being provided for each of said station emitters, and a single unidirectional optical backward line for carrying and distributing said optical combined information signal from said emitting means in said managing means to all of said station receivers.

2. The system according to claim 1 wherein said combined information signals in said backward line has a higher rate than the information rate of the signal in each of said forward lines.

3. The system according to claim 1 wherein said information signals derived from said station emitters are in a synchronous mode.

4. The system according to claim 1 wherein said information signals emitted from said station emitters are in an asynchronous mode.

5. The system according to claim 1 wherein the information signal emitted from said emitter in each of said stations includes a heading and useful data information, and wherein said processing means comprises: means connected to said receiving means for recovering clock signals relative to said stations respectively, means connected to said clock signal recovering means for recognizing and detecting said headings in said message emitted from said station emitters, means connected to said heading recognizing and detecting means for storing said useful data information in said messages emitted from said station emitters, means connected to said storing means and controlled by said heading recognizing and detecting means for grouping the stored useful information signals in each message with a predetermined heading, and means for encoding the grouped information signals into said electrical combined information signal so it is emitted by said single emitting means.

6. The system according to claim 1 wherein each of said stations includes: means for recognizing an optical information signal on the backward line directed to it, and means for coupling the recognized signal to the signal receiver to the exclusion of the remaining signals on the backward line.

7. The system according to claim 6 wherein each of said optical information signals includes a heading segment and a useful information data segment, the heading segment including an indication of the station to receive the optical information signal, each of said stations including means for transducing the optical information signal on the backward line into an electric signal that represents the heading segment and the useful information data segment, the recognizing means including means for comparing the heading segment electric signal with a stored indication of the particular station.

8. A digital information signal transmitting system comprising:
   plural stations each including an optical information signal emitter and an optical information signal receiver,
   first and second means for managing information signal exchanges between said stations, each of said managing means including several optical means for receiving information signals emitted by said emitters of said stations respectively, a single optical means for emitting information signals to be supplied to all of said receivers of said stations, and optical means for receiving information signals emitted from said single emitting means of the other managing means, and
   an optical transmission medium connected between said stations and said first and second managing means, said medium comprising plural optical unidirectional forward lines, each of said forward lines linking said emitter of a respective station to a respective receiving means of one of said managing means and to a respective receiving means of the other managing means through an optical distributing means, and a single optical bidirectional distributed backward line for linking said single emitting means of said first and second managing means to said receivers of said stations and said additional receiving means of said first and second managing means.

9. A digital information transmitting system comprising:
   plural stations, each including an optical information signal emitter and first and second optical information signal receivers,
   first and second means for managing exchanges of information signals between said stations, each of said managing means including several optical means for receiving information signals emitted from said emitters of said stations respectively, a single optical means for emitting information signals to one of said first and second receivers of all said stations and to an additional optical means for receiving an information signal emitted from said single emitting means of the other managing means, and
   an optical transmission medium between said stations and said first and second managing means, said transmission medium comprising plural optical unidirectional forward lines, each of said lines linking said emitter of a respective station to a respective receiving means of one of said managing means and to a respective receiving means of the other managing means through an optical distributing means, and first and second optical unidirectional distributed backward lines, each of said backward lines linking said single emitting means of one of said first and second managing means to one of said first and second receivers of said stations and said additional receiving means of said other managing means.

10. A digital information transmitting system comprising:
   first and second groups of stations, each station including an optical information signal emitter and an optical information signal receiver,
   an additional station including an optical information signal emitter and first and second optical information signal receivers,
   first and second means respectively assigned to said first and second station groups, each of said first and second means managing exchanges of information signals between said stations of said respective group and the other managing means, each of said managing means including several optical means for receiving information signals emitted from said emitters of said stations of said respective group respectively, a single optical means for emitting information signals to said receivers of said stations of said respective group and to one of said first and second receivers of said additional station, and an additional optical means for receiving information signals emitted from said emitter of said additional station, and
   first and second optical transmission mediums respectively assigned to said first and second station groups, each transmission medium being interconnected between said stations and said managing means of said respective group and said additional station and comprising several optical unidirectional forward lines, each of said several unidirectional forward lines linking said emitter of a respective station of said respective group to a respective receiving means of said managing means of said respective group, a single optical unidirectional distributed backward line for linking said single emitting means of said managing means of said respective group to said receivers of all said stations of said respective group and to one of said two emitters of said additional station, and an additional optical unidirectional forward line for linking said emitter of said additional station to said additional receiving means of said managing means of said respective group.

11. A digital information transmitting system comprising:
   first and second groups of stations, each station including an optical information signal emitter and an optical information signal receiver,
   first and second means respectively assigned to said first and second station groups, each of said first and second means exchanging information signals between said stations of said respective group and the other managing means, each of said managing means including optical means for receiving information signals emitted from said emitters of all said stations of said respective group respectively, a single optical means for deriving information signals supplied to said receivers of said stations of said respective group and to the managing means of the other group, and an additional optical means for receiving information signals derived by said single driving means of said managing means of said other group, and
   first and second optical transmission mediums respectively assigned to said station groups, each transmission medium being interconnected between said stations and said managing means of said respective group and comprising several optical unidirectional forward lines, each of said unidirectional forward lines linking said emitter of a respective station of said respective group to a respective receiving means of said managing means of said respective group, and a single optical bidirectional distributed backward line linking said single emitting means of said managing means of said respective group to said receivers of said stations of said respective group and to said additional receiving means of said managing means of the other group.

12. A digital information transmitting system comprising:
several groups of stations, each of said stations including an optical information signal emitter and an optical information signal receiver,
several station information managing means respectively assigned to said several station groups, each managing means including: several optical means for receiving information signals emitted from said emitters of said stations of the respective group respectively, a single optical means for deriving information signals supplied to said receivers of said stations of said respective group, and additional information receiving and emitting means,
several optical transmission mediums respectively assigned to said station groups, each transmission medium being interconnected to said stations and said managing means of the respective group and comprising several optical unidirectional forward lines, each of said forward lines linking said emitter of a respective station of said respective group to a respective receiving means of said managing means of said respective group, and a single optical unidirectional distributed backward line, said single backward line linking said single emitting means of said managing means of said respective group to said receivers of said stations of said respective group,
additional means for managing information signals exchanged between said station groups, said additional managing means including several optical means for respectively receiving information signals emitted by said additional emitting means of said managing means of said groups, and a single optical means for supplying grouped information signals to said additional receiving means of said managing means of said groups, and
an additional optical transmission medium interconnected between said managing means of said groups and comprising several additional optical unidirectional forward lines, each of said several additional forward lines linking said additional emitting means of said managing means of said groups to said receiving means of said additional managing means respectively, and a single additional optical unidirectional distributed backward line for linking said single emitting means of said additional managing means to said additional receiving means of said managing means of said groups.

13. A digital distributed information transmitting system comprising plural stations,
an optical transmission medium,
first and second optical filtering means,
means interconnected to said stations via the transmission medium and said filters for managing information signal exchanges between said stations, each station being fit to transmit an information signal to every other station and to itself and to receive information signals from every other station and itself through said managing means,
each station including an optical information signal emitter operating at a first wavelength and an optical information signal receiver operating at a second wavelength,
said managing means including plural optical receiving means operating at said first wavelength for converting said optical information signals emitted from said station emitters into electric information signals respectively, means for processing said electric station information signals to form a combined electric information signal, and a single optical emitting means operating at said second wavelength for converting said electrical combined information signal into an optical combined information signal to be distributed to all said station receivers;
said optical transmission medium comprising plural optical lines, each optical line unidirectionally carrying said optical information at said first wavelength from said emitter of one of said stations to one of said receiving means in said managing means respectively, and unidirectionally carrying said optical combined information at said second wavelength from said emitting means in said managing means to said receiver of said station,
said first optical filtering means comprising plural first optical filters, each first filter coupling said emitter and receiver in one respective station to a first end of one respective optical line, and
said second optical filtering means comprising plural second optical filters, each second filter coupling one respective receiving means and said single emitting means to a second end of one respective optical line.

* * * * *